Jan. 8, 1946.  C. B. SMITH ET AL  2,392,705
SCRUBBING TOWERS OR COLUMNS
Filed April 1, 1944  2 Sheets-Sheet 2
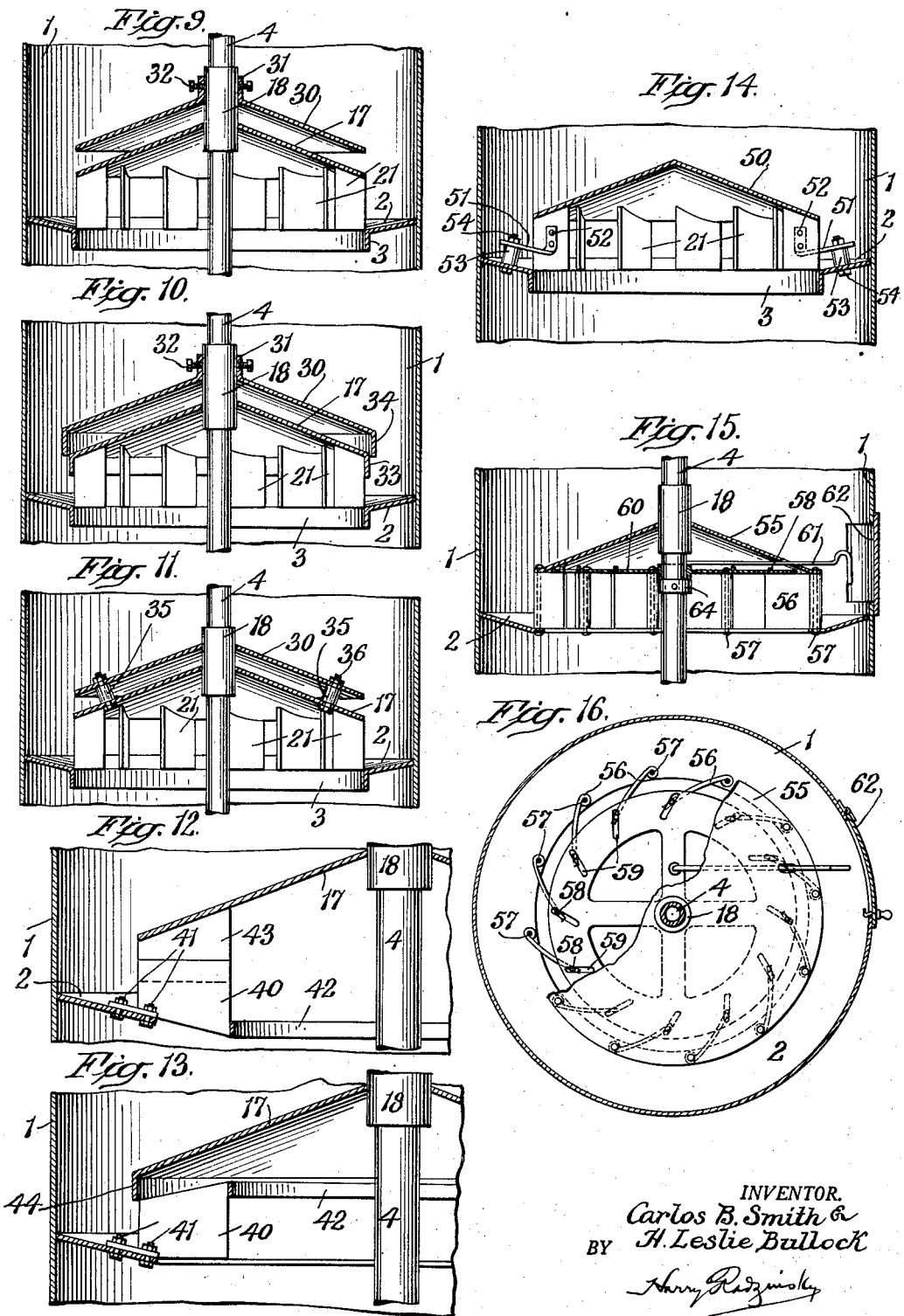
INVENTOR.
Carlos B. Smith &
BY H. Leslie Bullock
ATTORNEY Patented Jan. 8, 1946

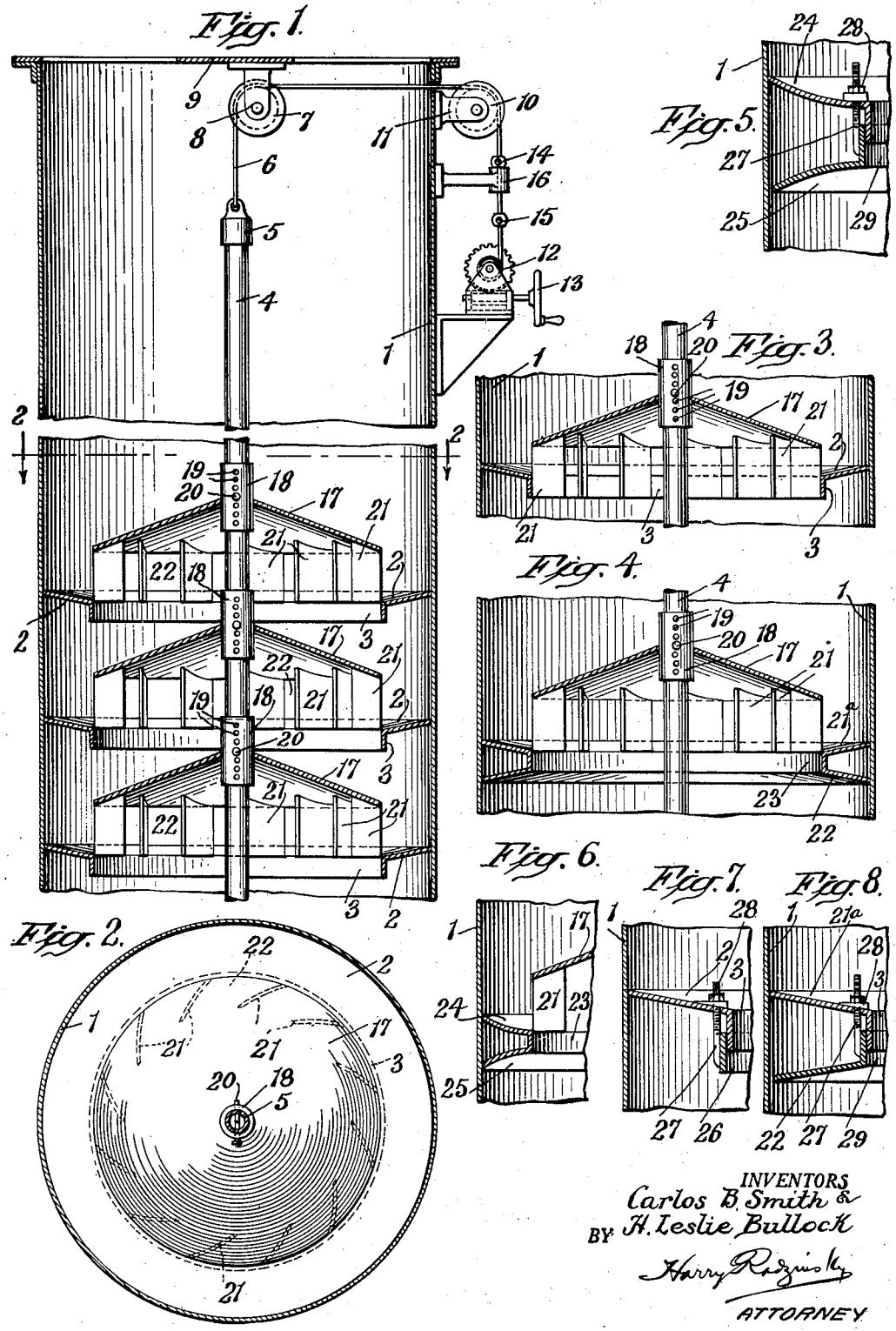

2,392,705

UNITED STATES PATENT OFFICE 2,392,705

SCRUBBING TOWER OR COLUMN

Carlos B. Smith and Harry Leslie Bullock,
New York, N. Y.

Application April 1, 1944, Serial No. 529,197

8 Claims. (Cl. 261—79)

This invention relates to scrubbing towers, absorption towers, and similar column arrangements in which an air or gas flow to be cleansed is introduced for flow in a direction opposite to the movement or flow of a cleaning or absorbing fluid, and in which the fluid spray is produced and maintained by the countercurrent velocity action of the air or gas. One of the deficiencies present in the conventional apparatus of this general type is that when a decrease of velocity of the air or gas through the column occurs, the counterflowing liquid remains in the form of relatively large drops, or even in streams, without being broken down into the fine spray or mist necessary for collection. In addition, the decrease of velocity of the air or gas flow cuts down on the contact of the air or gas with the wet baffles, and with the surfaces of the tower and separating plates, and results in the decrease of centrifugal force, thus allowing some lighter material to be driven or sucked through the column without being thrown out of the main ascending air or gas stream.

An object of the present invention is to provide means by which the velocity of the gas or air moving through the tower can be maintained, and particularly through those sections of the tower where the air or gas is caused to pass over the surface of baffles in an outwardly rotating direction, and where these moving gases come into contact with the dividing plates and the outside wall. The desired effect can be produced in a number of ways, several of which are shown in the drawings and hereinafter described.

In the accompanying drawings, wherein several embodiments of the invention are disclosed, Fig. 1 is a vertical sectional view of a portion of a column, constructed in accordance with the invention;

Fig. 2 is a sectional view on the line 2—2 of Fig. 1, looking in the direction of the arrows;

Fig. 3 is a sectional view through one of the conical hoods and baffle rings, showing the vanes carried by the hood in maximum degree of overlap with the baffle ring;

Fig. 4 is a view similar to Fig. 3, and showing a baffle ring of double-wall construction;

Fig. 5 is a sectional view showing means by which the effective depth of the inner edge or skirt-portion of a baffle ring of double-walled arrangement may be regulated;

Fig. 6 is a sectional view showing a double-walled baffle ring having its upper and lower walls curved or arched;

Fig. 7 is a sectional view showing a single-walled baffle, having means for adjusting the effective length of its dependent skirt;

Fig. 8 shows an adjustable means for the skirt of a double-walled flat-faced type of baffle ring;

Fig. 9 is a sectional view through a conical hood, showing the employment of a secondary hood adapted for adjustable placement above the main hood;

Fig. 10 shows a structure similar to that in Fig. 9, except that the hoods are provided with skirts adapted to be overlapped to a selected extent;

Fig. 11 shows a structure in which the upper hood is adapted to be held in spaced relation to the lower hood by means of spacing elements;

Fig. 12 is a sectional view showing the baffle ring provided with a plurality of upstanding vanes located between the vanes on the hood, whereby one set of vanes may be overlapped by the other to a selected extent;

Fig. 13 shows the vanes carried by the baffle ring, and the conical hood provided with a peripheral skirt to overlap the vanes to a selected extent by adjustment of the hood on its shaft;

Fig. 14 shows the hood provided with vanes which have lugs that support the hood relative to the baffle ring and at a selected position, according to the spacers employed between the lugs and the baffle ring;

Fig. 15 shows a structure wherein pivoted vanes are employed together with means by which all of the vanes may be simultaneously adjusted to a selected angle; and Fig. 16 is a plan view of the structure of Fig. 15, with some parts in section and others broken away to disclose construction.

With reference to the construction shown in Figs. 1 to 3, inclusive, 1 indicates a shell comprising the body of the tower or column, which is of the conventional cylindrical type. This shell confines the gases or air flow which moves upwardly through the column and out through filters located at the top of the tower, these and other elements relating to the directing of the air or gas flow, as well as the means for directing water flow through the column, being omitted for simplicity in illustration.

Provided at spaced intervals within the tower or column are baffle rings 2, secured at their outer edges or peripheries to the inside of the tower or column. Each of said baffle rings 2 has its inner edge provided with a dependent skirt 3, thus defining a central opening in the ring. Extending upwardly through the center opening in the various spaced baffle rings is a vertically adjustable shaft adapted to be raised or lowered for any selected distance. For this purpose, the shaft 4 is provided at its top with an eye-cap 5 attached to one end of a supporting cable 6 extending over a pulley 7 rotatively mounted in the bearings 8 fastened to the top plate 9 of the column or tower. The cable 6 extends over an outer pulley 10 rotatively supported in the bearing 11 secured on the outside of the column 1, from whence it extends to the windlass 11 operated by the crank 13. The cable is provided with the spaced stops 14 and 15 operative against the bracket 16 secured to the column 1, to thereby limit the raising and lowering movement of the shaft 4. The means for raising and lowering the shaft is suggestive, as various other devices may be used for the purpose.

Secured on the shaft 4 are a number of conical hoods 17, each hood having its concave face directed downwardly and provided with a central hub or sleeve 18 surrounding the shaft 4. Each hub 18 can be fixedly secured to the shaft 4 in proper position, or it can be arranged with a series of holes 19 and fastening pin 20, permitting the selected location of each of the hoods on the shaft 4. It will be observed that each of the conical hoods 17 is located slightly above one of the baffle rings 2, and that each hood carries a plurality of spaced radial and angularly disposed deflecting vanes 21 dependent from it. These vanes are arranged at the outer edge of each of the hoods 17, and impart a swirling action to the upwardly rising gases, so that the gases rotate within the tower 1. The vanes 21 are spaced apart so that openings 22 are located between them, and the effective size of these openings can be regulated by raising or lowering the shaft 4 to cause the edges of the vanes to be overlapped to a greater or lesser extent by the skirt 3 on each of the baffle rings 2. Thus, for maximum capacity, the shaft 4 is elevated to bring the lower edges of the vanes to a level with the top of the skirt 3, as shown in Fig. 1. In Fig. 3, the openings 22 are reduced to the maximum extent by lowering of the shaft 4, so that the vanes on each of the hoods 17 have their lower edges brought down to the lower edge of the skirt 3. It will, of course, be clear that any selected intermediate position for the hood is possible by merely raising the shaft 4 to secure the desired overlap of the vanes by the skirts 3.

In the operation of the tower, a water flow is introduced above the uppermost hood 17, causing the water to flow downwardly over the hoods 17 and baffles 2, and become broken up into a fine mist or spray by the action of the rising and swirling gases introduced near the lower end of the tower or column 1. By regulation of the hoods, and vanes carried thereby, with respect to the skirts provided on the baffle rings, efficient contact velocities are maintained between the moving gas flow and the descending liquid, and with the wet internal surfaces within the column.

In Fig. 4 is shown a double-walled baffle ring having an upper wall 21a and a lower wall 22, said walls diverging from the skirt portion 23 toward the wall of the column to which the two walls 21a and 22 are secured. This construction avoids dead spots underneath the rings, and provides for a more uniform circulation of the gas. Fig. 6 shows a somewhat similar arrangement of a doubled-walled baffle ring. The ring in this embodiment is provided with the curved or arched surfaces 24 and 25 instead of the flat surfaces shown in Fig. 4. The construction of Fig. 6 can be used where it is desirable to keep the resistance as low as possible, and where an extremely uniform flow of the gas through the tower is desired.

In Figs. 5, 7 and 8, means are shown for regulating the effective depth of the skirt or flange at the inner edge of both the single-wall and double-walled baffle plate, to thereby regulate the velocity of the inwardly moving gases. In Fig. 7 is shown a ring 26 of a diameter enabling it to fit around the skirt 3 of the baffle ring 2. Bolts 27 attached at spaced points to one face of the ring 26 extend upwardly through holes provided in the baffle ring 2. By adjustment of the nuts 28 on the bolts 27, ring 26 can be raised or lowered to provide the correct open areas between the vanes 21. In the construction shown in Fig. 5, the bolts 26 are provided on the upstanding flange formed on the lower wall 25, which, in this construction, is not attached to the wall of the tower, but is wholly supported by the bolts 27 which can raise or lower the wall 25 and integral flange 29, to regulate the effective area of the skirt formed by the overlapped parts 23 and 29. The arrangement shown in Fig. 8 is similar to that of Fig. 5, except that the double-walled baffle ring has flat surfaces, as indicated at 21a and 22 in Fig. 4.

In Fig. 9 is shown the assembly of a double-cone hood. Located over the main hood 17 is a second cone 30 provided with its own hub 31 held on the shaft 4 by the set screws 32, so that it can be moved up or down on the shaft and fixed at any selected distance from the hood 17. When the apparatus is adjusted for a maximum flow of gas, the upper cone 30 should be positioned to lie in contact with the hood 17, and the cone and vane assembly raised to its maximum. To adjust the apparatus for less than maximum flow, the hood 17 and attached vanes are lowered to the required extent to shroud off as much of the apertures between the vanes as is necessary to give the proper velocity to the outwardly moving gas. The upper cone 30 would be raised to a point where it would act to block off the area above the hood 17 to give the correct velocity to the inwardly moving gas.

Fig. 10 shows another arrangement for two adjusting cones, wherein the lower cone or hood 17 is provided with a peripheral skirt extending vertically from it, and the upper cone 30 also has a vertical skirt at its peripheral edge of a proper diameter to overlap the skirt 33. Relative adjustment of the two skirted cones 17 and 30, shown in Fig. 10, is used to regulate the velocity of the gases passing both inwardly and outwardly, as was described in connection with the structure of Fig. 9.

In Fig. 11, the upper cone 30 is held spaced relatively to the hood 17 by means of spacers 35 of required height, extending through the bolts 36. This construction is particularly useful where the hood 17 is supported on the baffle ring, as shown in Fig. 14.

Fig. 12 illustrates another means by which regulation of the velocity of the gas passing through the apparatus may be had. In this construction, the baffle ring 2 is provided with a plurality of upstanding spaced vanes 40 secured to the top face of the baffle ring by being bolted or riveted thereto as at 41, and having their inner edges connected by the annulus 42. The hood 17 has a plurality of dependent vanes 43 located between the vanes 40 on the baffle ring, and arranged to overlap the same to an extent required according to the positioning of the hood 17 on the shaft 4. In Fig. 13, the baffle ring 2 carries the vanes 40, but the hood 2 is provided with a skirt 44 which will cover or uncover outer edge portions of the vanes 40, and thereby control the effective size of the spaces between the same when the hood 2 is raised or lowered, as required.

In the structure of Fig. 14, the central shaft 4 is omitted, and hood 50 is supported at the selected height above the baffle ring 2 by the lugs 51, secured at 52 to the vanes 21, and resting on the spacers 53 surrounding the bolts 54 which extend through the baffle ring and through lugs 51. By using spacers of selected height, the overlap of the skirt 3 with the vanes 21 is regulated.

In Figs. 15 and 16 is shown means by which the velocity of the moving gases may be regulated by pivotally moving the vanes located between the hood and the baffle ring. In this construction, the height of the hood 55 above the baffle ring 2 remains constant. Movable vanes 56 are supported on vertical vane shafts 57 extending between the baffle ring 2 and the hood 55. Attached to the inner part of each vane is a pin 58 engaging in a slot 59 in an adjusting spider 60 supported for rotative movement on a hub 64 secured on the shaft 4. An adjusting rod 61, provided with an appropriate lock, is used to shift the adjusting spider 60 to cause it to simultaneously move the vanes to the desired angular position. The adjusting rod 61 normally remains inside of the tower 1 and is reached for adjustment through an access door 62 provided in the column.

While we have described several embodiments of the invention, it is obvious that numerous departures may be made therefrom without departing from the spirit of the invention. We therefore do not restrict ourselves to the embodiments shown, since the invention disclosed is broad enough to cover all structures coming within the scope of the annexed claims.

What we claim is:

1. In an apparatus of the character described, a cylindrical tower or column having a stage including an annular baffle ring, a hood disposed above the ring, said hood being provided with radially disposed vanes, and means whereby the relative spacing of the hood and baffle ring and the overlap of the vanes with the baffle ring can be varied to maintain efficient contact velocities between a gas flow through the tower and a descending liquid flow and with the wet surfaces of the tower, baffle ring and hood, said means including a shaft on which the hood is mounted and means for bodily moving the shaft and the hood carried thereby and including also means by which the hood can be shifted relative to said shaft.

2. In an apparatus of the character described, a tower or column having a stage including an annular baffle ring, a conical hood disposed above the ring, said hood having a plurality of dependent equally spaced radially disposed vanes, and means by which the spacing of the hood and the ring and the overlap of the vanes in relation to the ring may be varied to maintain efficient contact velocities between a gas flow through the tower and a descending liquid flow and wet surfaces of the tower, said means including a movably mounted support for the hood and adjustable means for securing the hood to the support.

3. In an apparatus of the character described, a cylindrical tower having spaced, fixed annular baffle rings within it, a vertically movable support carrying spaced hoods, each of said hoods being located adjacent to one of the baffle rings and being adjustable relative to its support, each hood being provided with a plurality of spaced deflecting vanes, each of the baffle rings having a dependent skirt, and means for raising or lowering the hoods and the baffle rings carried thereby whereby the skirts on the baffle rings will increase or decrease the size of the openings between the vanes and hoods to thereby maintain efficient contact velocities between gas and liquid flows proceeding oppositely through the tower.

4. In an apparatus of the character described, a tower of cylindrical form having spaced and skirted annular baffle rings located within it, a vertically movable shaft within the tower and located concentrically of the rings, a plurality of spaced conical hoods fixed on said shaft whereby said hoods may be simultaneously raised or lowered with the shaft, means on the shaft for adjustably mounting each of the hoods thereon, and spaced radial vanes carried by the hoods and movable with the hoods into or out of the skirted portions of the annular rings.

5. In an apparatus of the character described, a cylindrical tower, an annular baffle ring secured in the tower, the inner edge of said ring being provided with a vertically disposed skirt, a movable conical hood located above the ring and having a plurality of spaced, radially extending deflecting vanes situated adjacent to its peripheral edge, and means by which the spacing of the hood from the ring may be regulated to control the extent to which the skirt on said ring overlaps the vanes, said means including a vertically movable support for the hood and means by which the hood is adjustable relative to said support.

6. In an apparatus of the character described, a tower or column through which a rising gas flow is directed against a descending flow of liquid, an annular baffle ring secured to the wall of the tower and contained within the tower, a hood having a plurality of radial vanes located at the inner edge of the baffle ring, said ring having a vertically disposed wall extending around the vanes, said wall being composed of fixed and movable sections, and means by which the position of the movable section relative to the fixed section may be regulated to increase or decrease the effective area of said wall.

7. In a device of the character described, a tower or column, an annular baffle ring within the tower or column, a vaned hood situated over the ring and adjustable relatively to the ring, and a cone situated above the hood and corresponding substantially to the shape thereof, and means by which the cone may be positioned at selected distances from the hood.

8. In an apparatus of the character described, a cylindrical tower or column through which a rising gas flow is directed against a descending flow of liquid, a plurality of spaced, horizontally disposed, annular baffle rings secured to the inner face of the tower and extending toward the center of the tower, each of said rings having a central opening surrounded by a vertical annular wall, a centrally-disposed vertical shaft extending through the openings in the several rings, said shaft carrying a plurality of spaced conical hoods, means on the shaft for adjustably mounting the hoods thereon, each hood being located near one of the rings and being adjustable on the shaft relative to said ring, each hood having a plurality of radial vanes near its outer edge and directed downwardly toward the adjacent ring, and means for raising or lowering the shaft to bring the vanes into or out of the openings in the baffle rings to a selected extent, said means including a cable attached at one end to the upper end of the shaft and connected to wind-up means located externally of the tower.

CARLOS B. SMITH.
H. LESLIE BULLOCK.